(12) United States Patent
Saldhana

(10) Patent No.: US 9,129,126 B2
(45) Date of Patent: Sep. 8, 2015

(54) UPDATING CHANGES TO CACHES

(75) Inventor: Anil Saldhana, Oak Park, IL (US)

(73) Assignee: Red Hat, Inc., Raleigh, NC (US)

( * ) Notice: Subject to any disclaimer, the term of this patent is extended or adjusted under 35 U.S.C. 154(b) by 238 days.

(21) Appl. No.: 13/112,448

(22) Filed: May 20, 2011

(65) Prior Publication Data

US 2012/0296873 A1 Nov. 22, 2012

(51) Int. Cl.
*G06F 17/30* (2006.01)
*G06F 21/62* (2013.01)
*H04L 29/06* (2006.01)

(52) U.S. Cl.
CPC ............ *G06F 21/6218* (2013.01); *H04L 63/10* (2013.01); *H04L 63/168* (2013.01); *G06F 2221/2115* (2013.01); *G06F 2221/2119* (2013.01); *G06F 2221/2143* (2013.01); *H04L 63/062* (2013.01)

(58) Field of Classification Search
CPC . H04L 63/08; H04L 63/0807; H04L 63/0823; H04L 63/10; H04L 63/062; G06F 21/60; G06F 21/6218
USPC .......... 707/781, 783, 784, 785; 709/226, 227, 709/228, 229, 203, 213; 719/315
See application file for complete search history.

(56) References Cited

U.S. PATENT DOCUMENTS

| | | | |
|---|---|---|---|
| 5,919,247 A | 7/1999 | Van Hoff et al. | |
| 6,772,206 B1 | 8/2004 | Lowry et al. | |
| 6,922,695 B2 | 7/2005 | Skufca et al. | |
| 7,373,654 B1 * | 5/2008 | Reid | 726/1 |
| 2003/0065826 A1 | 4/2003 | Skufca et al. | |
| 2003/0065827 A1 * | 4/2003 | Skufca et al. | 709/203 |
| 2003/0220990 A1 * | 11/2003 | Narayanan et al. | 709/227 |
| 2004/0103323 A1 * | 5/2004 | Dominic | 713/202 |
| 2006/0047813 A1 * | 3/2006 | Aggarwal et al. | 709/226 |
| 2006/0248276 A1 | 11/2006 | Kilian et al. | |
| 2007/0288588 A1 * | 12/2007 | Wein et al. | 709/214 |
| 2008/0066166 A1 * | 3/2008 | Childs et al. | 726/5 |
| 2008/0307408 A1 | 12/2008 | Saldhana | |

OTHER PUBLICATIONS

USPTO; Office Action for U.S. Appl. No. 11/761,186, mailed Oct. 27, 2010.
USPTO; Office Action for U.S. Appl. No. 11/761,186, mailed Apr. 18, 2011.
USPTO; Office Action for U.S. Appl. No. 11/761,186, mailed Oct. 31, 2012.
USPTO; Office Action for U.S. Appl. No. 11/761,186, mailed May 8, 2013.

* cited by examiner

*Primary Examiner* — Vincent F Boccio
(74) *Attorney, Agent, or Firm* — Lowenstein Sandler LLP

(57) ABSTRACT

Embodiments relate to systems and methods for updating changes to caches. In aspects, a provisioning server can receive by a hardware processor a security data provisioning request from a first application server in a set of application servers. In response to receiving the security data change provisioning request, identifying updated security data compatible with the cache of a second application server of the set of application servers. Further, sending a command to the second application server of the set of application servers to clear the cache of the second application server of the set of application servers. A provisioning server sending the updated security data to the cache of the second application server of the set of application servers.

16 Claims, 4 Drawing Sheets

UPDATING CHANGES TO CACHES

FIELD

The invention relates generally to systems and methods for maintaining security, and more particularly, to platforms and techniques for maintaining consistencies in security cache data across a cluster of application servers.

BACKGROUND

Application servers are entities in system and network environments in which various applications can execute or operate. In particular, application servers are dedicated to the efficient execution of processes, procedures, routines, scripts, and software code for supporting the functionalities of applications. Software developers can access application servers via various application programming interfaces (APIs).

The Java Platform, Enterprise Edition, Java EE, or J2EE are widely used platforms for server programming in the Java programming language. A J2EE container is a runtime entity that provides services to specialized Java components. Services provided by a container typically include life cycle management, security, deployment, and component-specific services. Containers are used in a wide variety of Java components, such as Enterprise Javabeans (EJB), Web pages, Java Server Pages (JSP), servlets, applets, and application clients.

For security information, J2EE containers typically cache their security caches in a Java Virtual Machine (JVM) to avoid round trip latency to third party sources like a database or a directory service. However, when these sources change information (e.g. passwords, login credentials, attributes, etc.), the security cache can become inconsistent with what is current.

Typically, J2EE containers employ a timeout feature to attempt to keep their security cache current. However, timeouts are generally insufficient in keeping security caches current in dynamic environments.

Therefore, it may be desirable to provide systems and methods for maintaining consistencies among security caches of application servers. In particular, it may be desirable to provide systems and methods for a provisioning server to provision security data updates to security caches of a requesting application server when updated data is available.

DESCRIPTION

Embodiments of the present teachings relate to systems and methods for maintaining security in a network. In particular, embodiments relate to platforms and techniques for maintaining data consistencies among a plurality of security caches associated with a set of application servers. A server management system or other logic can comprise a provisioning server coupled to a directory server. The provisioning server and the directory server can be configured to connect to the set of application servers. Each of the set of application servers can comprise a security cache configured to store security data or other data for use in conjunction with the set of application servers.

According to embodiments, a provisioning application running in one of the application servers can send a provisioning request to the provisioning server, for example to change security data. The provisioning server can send the request to the directory server that can store the security data associated with the application servers. Further, the provisioning server can send a command to each of the application servers that causes a security cache in each of the application servers to be cleared of data. In embodiments, the directory server can send updated security data to each of the application servers. The updated security data can be stored in each of the security caches of the application servers, such that the security caches comprise data consistent across the application servers.

Figure 1:
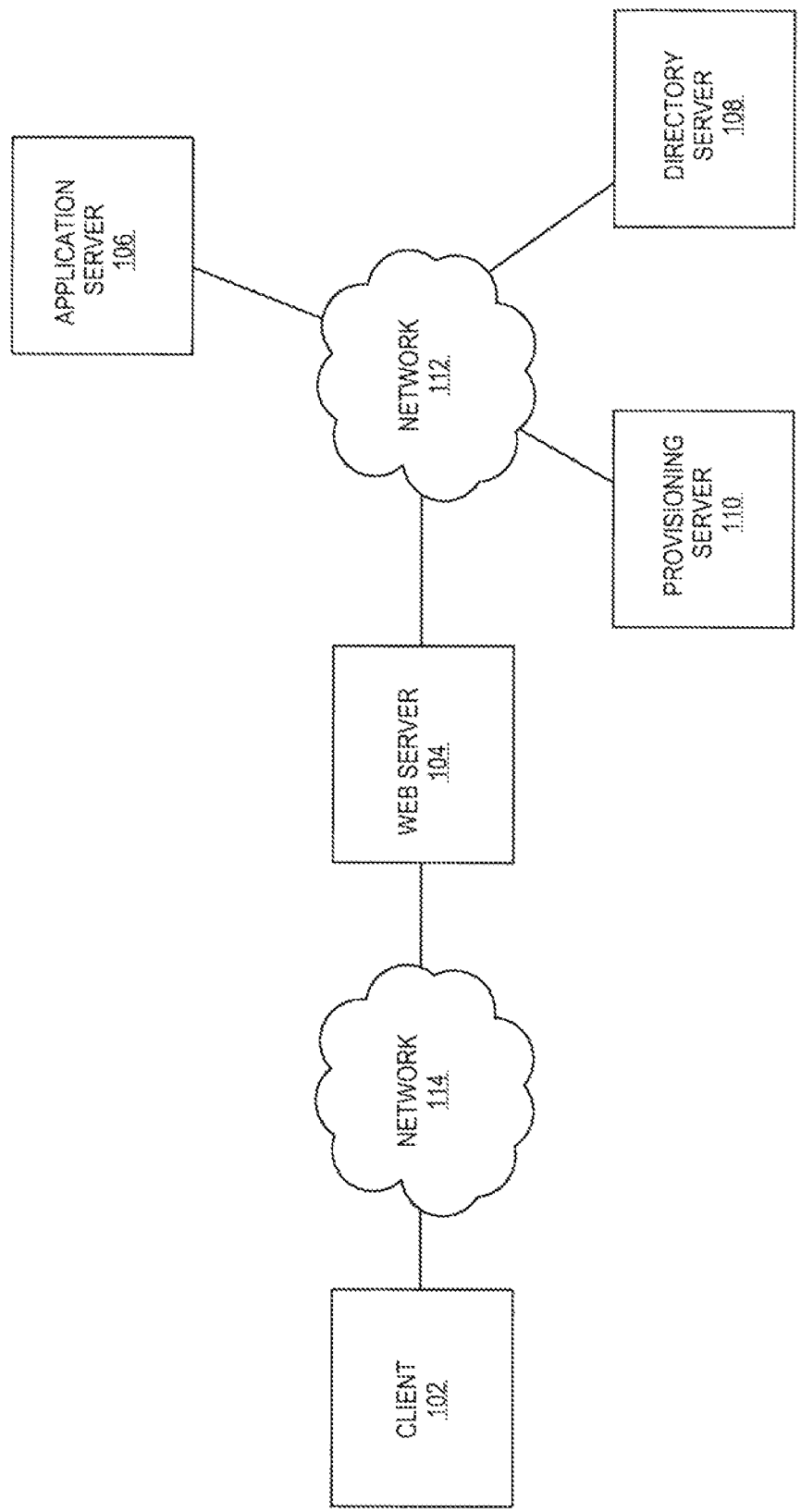
FIG. 1 illustrates an overall system architecture in which various aspects of systems and methods for maintaining security can be practiced, according to embodiments.

Referring to FIG. 1, illustrated is an exemplary system 100 in which the present systems and methods may be implemented. To help explain the principles of the present systems and methods, the system 100 is shown configured as a web application comprising functionality in which users must be authenticated via, for example, security cache data. Accordingly, as shown, the system 100 can comprise a client 102, a web server 104, an application server 106, a directory server 108, and a provisioning server 110. These components can be coupled together via networks 112 and 114, respectively, or other networks. It should be appreciated that other configurations and inclusions of other components are envisioned in accordance with the present systems and methods.

In embodiments, the client 102 can be any computer system that utilizes the services of another computer system, i.e., the web server 104 and the application server 106. As shown in FIG. 1, the client 102 can be implemented using components well known to those skilled in the art, such as a personal computer, laptop computer, personal digital assistant, mobile phone, tablet device, and the like. In the embodiments as shown in FIG. 1, the client 102 can be used to run Web applications via an application, such as a web browser.

In embodiments, the web server 104 can be a computer system configured to accept requests from clients, such as the client 102, and serve responses along with optional data contents. For example, a user of the client 102 can execute a Web application via the web server 104. In the embodiment as shown, the data content served by the web server 104 can be one or more Web pages that can include hypertext markup language (HTML) documents and linked objects such as, for example, images, video, audio, and the like.

The web server 104 can be implemented on a machine that comprises well known hardware and software. Well known software for the web server 104 can include, but is not limited to, software such as Apache HTTP Server from the Apache Software Foundation, Internet Information Services by Microsoft Corporation®, and Sun Java System Web Server from Sun Microsystems Inc®. One skilled in the art will recognize that any of the many different Web server programs available are consistent with the principles of the present invention.

The application server 106 can be software that provides applications to the client 102. In particular, the application server 106 can be configured to handle security, business logic, and data access for the applications provided to the client 102. In embodiments, the application server 106 can be configured to provide a variety of Web-based applications, such as e-commerce applications, content management applications, customer relations management applications, and the like.

The application server 106 can be implemented on various software platforms. For example, the application server 106 can be implemented on the well known J2EE platform from Sun Microsystems Inc®. In addition, the application server 106 can comprise middleware configured to enable applications to intercommunicate with dependent applications, such as the web server 104, database management systems, etc.

In further embodiments, the application server 106 can be implemented using well known software. For example, the application server 106 can be implemented using software, such WebLogic server from BEA Systems Inc®, JBoss from Red Hat Inc.®, Websphere from the IBM Corporation®, and the like. Accordingly, the application server 106 can implement the Java programming language and provide Web modules using servlets and JavaServer pages. Other functions of the application server 106 can also employ Java. For example, business logic provided by the application server 106 can be built into Enterprise JavaBeans (EJBs). J2EE can provide standards for containing, the Web components. In addition, security services, such as authentication and authorization, can be implemented using the Java Authentication and Authorization Service (JAAS) or similar service.

The directory server 108 can represent the components that store and organize information about the users of the system 100 and an administrator of the system 100 to manage those users' access to the resources of the system 100. In embodiments, the directory server 108 can comprise a database (not-shown) that can store information about named objects that are managed. The directory server 108 can also provide, the access interface to the data that is contained in this database. The directory server 108 can be implemented using well known technologies. For example, the directory server 108 can implemented as an X.509 directory service or Lightweight Directory Access Protocol (LDAP) service. In embodiments, the directory server 108 can be implemented as services from various vendors such as, for example, Red Hat Directory Server from Red Hat Inc.®; Active Directory by the Microsoft Corporation®; Apache Directory Server by the Apache Software Foundation; and Sun Java System Directory Server by Sun Microsystems Inc®.

In embodiments, the provisioning server 110 can be software, hardware, or a combination thereof that can be configured to listen for provisioning requests in the system 100 and return provisioning responses. In some embodiments, the provisioning server 110 can be configured as a service provisioning markup language (SPML) provisioning service provider. The provisioning server 110 can be implemented as a separate software component of the system 100 or can be integrated with other components of the system 100. For example, the provisioning server 110 can be a component that is installed as part of the directory server 108.

In embodiments, the network 114 can represent the communications infrastructure for allowing the client 102 and the web server 104 to communicate with each other. For example, the network 114 can represent the Internet, which is a worldwide, publicly accessible network that uses the Internet Protocol (IP) suite of standards. In embodiments, the network 112 can represent the communications infrastructure that allows the web server 104, the application server 106, the directory server 108, and the provisioning server 110 to communicate with each other. In embodiments, the network 112 can be implemented as a local area network or may utilize one or more larger networks, such as the Internet.

Figure 2:
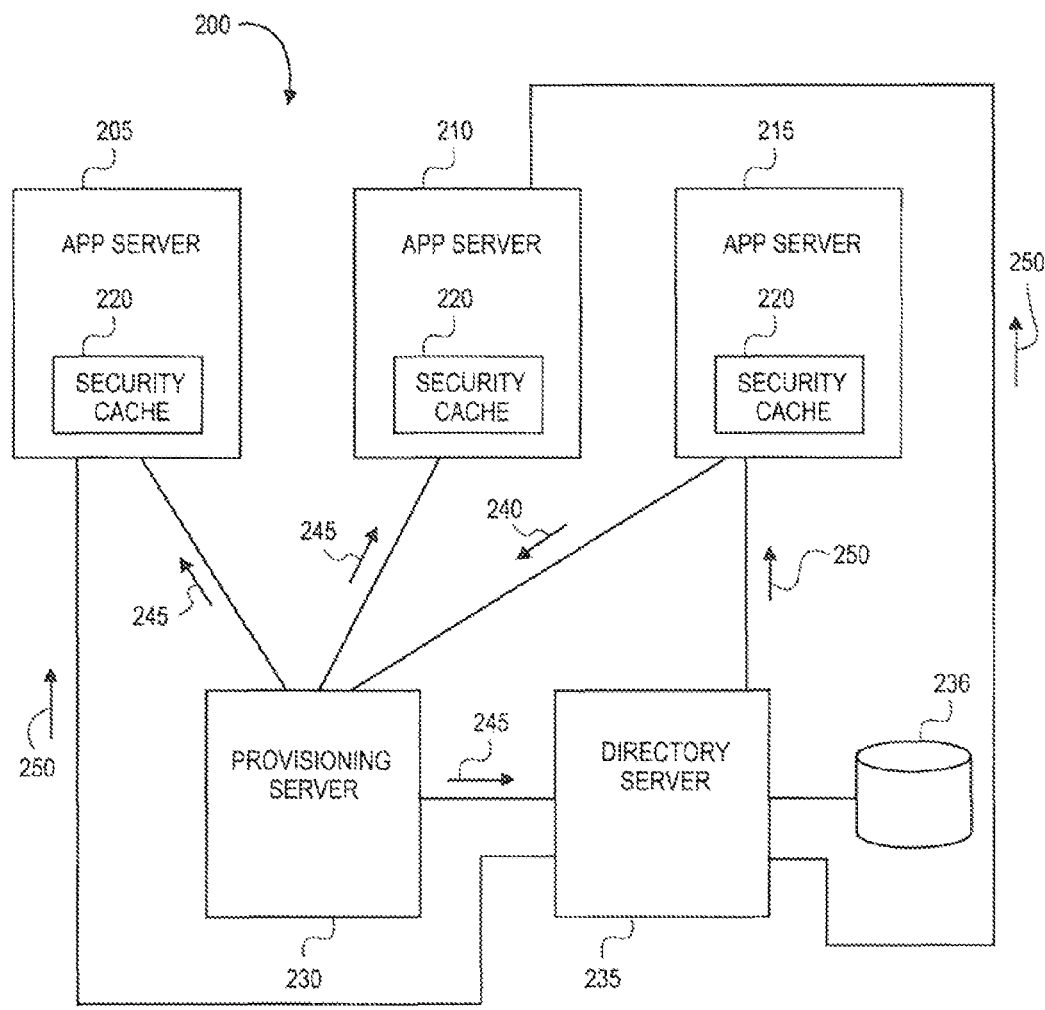
FIG. 2 illustrates a detailed system architecture in which various aspects of systems and methods for maintaining security can be practiced, in further regards.

FIG. 2 illustrates a detailed embodiment of a security data provisioning system 200. In embodiments, the system 200 can comprise a set of application servers 205, 210, 215. According to embodiments, the set of application servers 205, 210, 215 can all belong to a cluster, or, in embodiments, one or more of the set of application server 205, 210, 215 can comprise a cluster. For example, application servers 205, 210 can belong to a cluster, and application server 215 can join or leave the cluster at any point.

Each of the application servers 205, 210, 215 can comprise a security cache 220. In embodiments, the security cache 220 can store or be configured to store security data or other forms of data. For example, the security data can be related to user credentials such as user login and password information, or other attributes. It should be appreciated that the security cache 220 can be configured to be any size and to store any type of data over any period of time. As shown in FIG. 2, each of the application servers 205, 210, 215 can be configured to connect to a provisioning server 230 and/or a directory server 235 via a network such as the Internet (not shown in figures) or any other type of connection. In embodiments, the provisioning server 230 and the directory server 235 can be housed in the same location, or in separate locations. Further, in embodiments, the directory server 235 can comprise a local or remote database 236 configured to store provisioning, security, or other related data.

According to embodiments, one of the application servers can submit a provisioning request to the provisioning server 230. For example, as referenced by 240 in FIG. 2, the application server 215 can send the provisioning request. In embodiments, a provisioning application associated with the application server 215 can send the provisioning request. In embodiments, the application server 215 can be a member of a cluster with the other application servers 205, 210, or can be separate from the other application servers 205, 210.

In embodiments, once the provisioning server 230 receives the provisioning request, the provisioning server 230 can be configured to send the provisioning request to the directory server 235, as referenced by 245 in FIG. 2. Further, in embodiments, the provisioning server 230 can be configured to send a command, request, instruction, and/or the like to any or all of the application servers 205, 210, 215, wherein the command, request, instruction, and/or the like can be configured to cause data of the respective security cache 220 in each of the application servers 205, 210, 215 to be cleared, invalidated, overwritten, and/or the like. As shown in FIG. 2, reference 245 can refer to the provisioning server 230 sending a cache overwrite instruction to application servers 205, 210. In response to receiving the cache overwrite instruction, a processor, module, or other logic associated with the application servers 205, 210 can be configured to overwrite appropriate data of each of the respective security caches 220. In embodiments, the provisioning server 230 can concurrently send the cache, overwrite instruction to the appropriate application servers and the provisioning request to the directory server 235.

In embodiments, in response to the respective application servers clearing the respective security caches 220, the directory server 235 can be configured to send security data to the respective application servers, to be stored in the respective security caches 220. The security data can be the most recent or updated security data available to the directory server 235. In embodiments, the security data can be retrieved from the database 236 or from other memory. As referenced by 250 in FIG. 2, the directory server 235 can be configured to send the security data to each of the application servers 205, 210, 215, including the application server 215 that originally sent the provisioning request (as referenced by 240).

In response to receiving the security data, a processor, module, or other logic associated with the application servers 205, 210, 215 can be configured to store the security data in each of the respective security caches 220. Accordingly, the security caches 220 of each of the application servers 205, 210, 215 can comprise the most recent or updated security data available to the directory server 235. In embodiments, each of the application servers 205, 210, 215 can execute their respective applications utilizing the updated security data of each of the security caches 220.

In embodiments, the provisioning server 230, the directory server 235, or other logic can be configured to receive an indication of updated security data. Further, the provisioning server 230, the directory server 235, or other logic can access the updated security data. For example, an administrator, owner, or other entity can modify a user credential entry, or any other type of security data, directly within the directory server 235, and the directory server 235 can notify the provisioning server 230 or any of the application servers 205, 210, 215 of the updated data. In another example, the security data can be updated remotely from the directory server 235, and the updated security data can be provided to the directory server 235 for storage.

As an example of the present embodiments, a banking institution is provided with a plurality of application servers that perform applications related to account servicing. Employees of the bank have login credentials to access the applications and conduct the associated functionality, wherein the application servers can store the login credentials in respective security caches. Further, different application servers can comprise different applications. For example, one application server can comprise an application used to open accounts, and another application server can comprise another application used to transfer money among bank accounts. When the bank hires a new employee, the new employee can be assigned login credentials to access the applications. However, the security caches of the application servers may not have updated data with the new employee's login credentials. Therefore, the security caches need to be provisioned with updated security data so that the employee can access and execute the associated applications.

As discussed herein, a provisioning request can be received at a provisioning server of the bank, which can in turn be provided to a directory server that can store the most, recently-updated security data. The provisioning server can send cache invalidation requests to the application servers, which can cause the security caches of the application servers to be cleared. In response to clearing the security caches, the directory server can send the updated security data, comprising the login credentials for the new employee, to the application servers for storage in the security cache. Accordingly, when the new employee attempts to log, in or otherwise access any applications associated with the application servers, the updated security cache data will have the new employee's login credentials, as needed.

Figure 3:
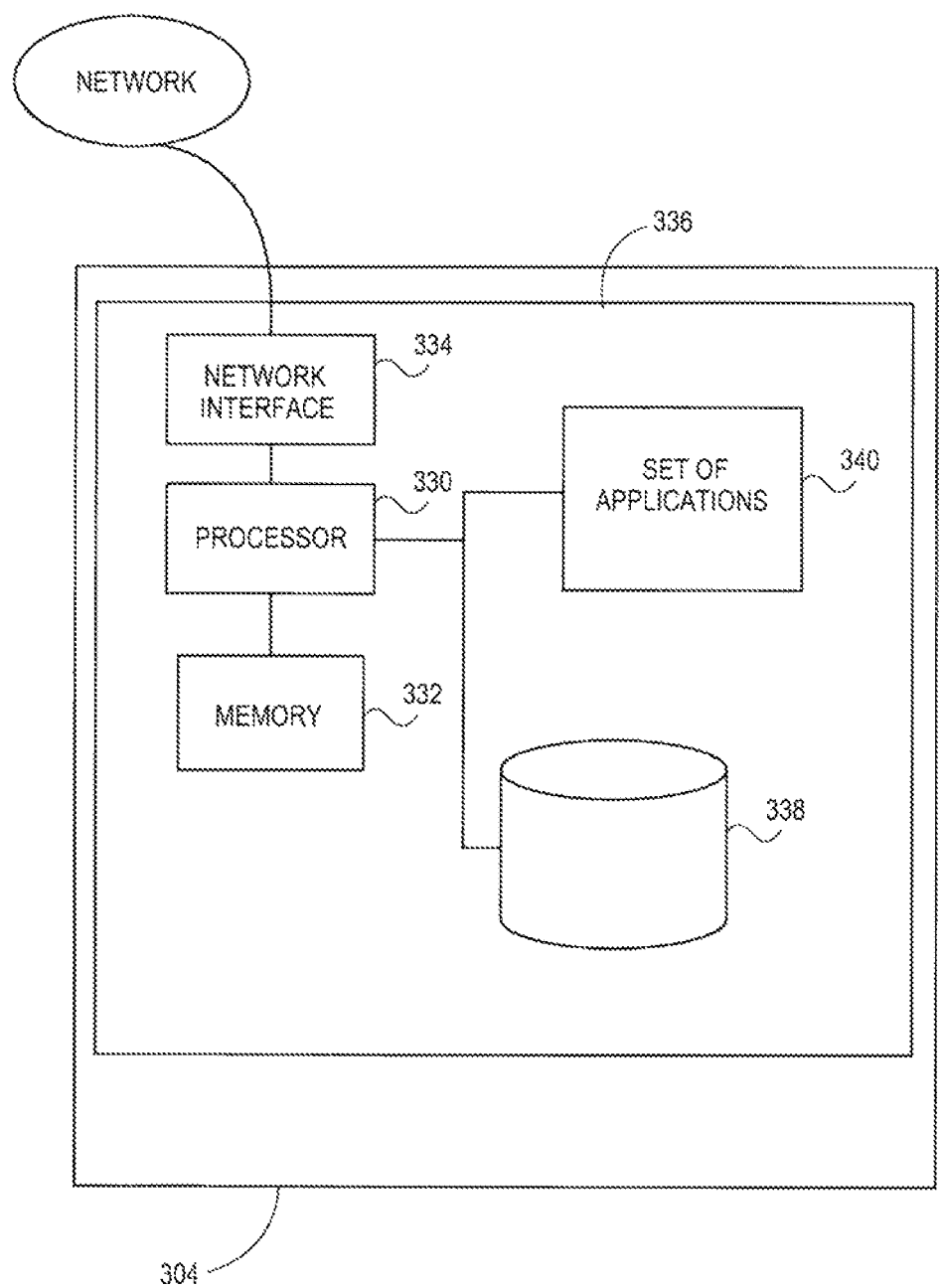
FIG. 3 illustrates an exemplary hardware configuration for a provisioning server configured to provision one or more application servers, according to various embodiments.

FIG. 3 illustrates an exemplary diagram of hardware and other resources that can be incorporated in a provisioning server 304 configured to communicate with a set of application servers, and/or other entities, services, or resources via one or more networks 306 and/or other connections, according to aspects. In embodiments, the directory server 235 can comprise the same or similar elements as described with respect to the provisioning server 304, or can be configured with different hardware and software resources. In embodiments as shown, the provisioning server 304 can comprise a processor 330 communicating with memory 332, such as electronic random access memory, operating under control of or in conjunction with an operating system 336. The operating system 336 can be, for example, a distribution of the Linux™ operating system, the Unix™ operating system, or other open-source or proprietary operating system or platform. The processor 330: can also communicate with a database 338, such as a database stored on a local hard drive, and set of applications 340, to execute control logic and control the operation of the set of application servers 205, 210, 215, the distribution server 235, and/or other resources. The processor 330 can further communicate with a network interface 334, such as an Ethernet or wireless data connection, which in turn communicates with the one or more networks 306, such as the Internet or other public or private networks. Other configurations of the provisioning server 304, associated network connections, and other hardware, software, and service resources are possible.

Figure 4:
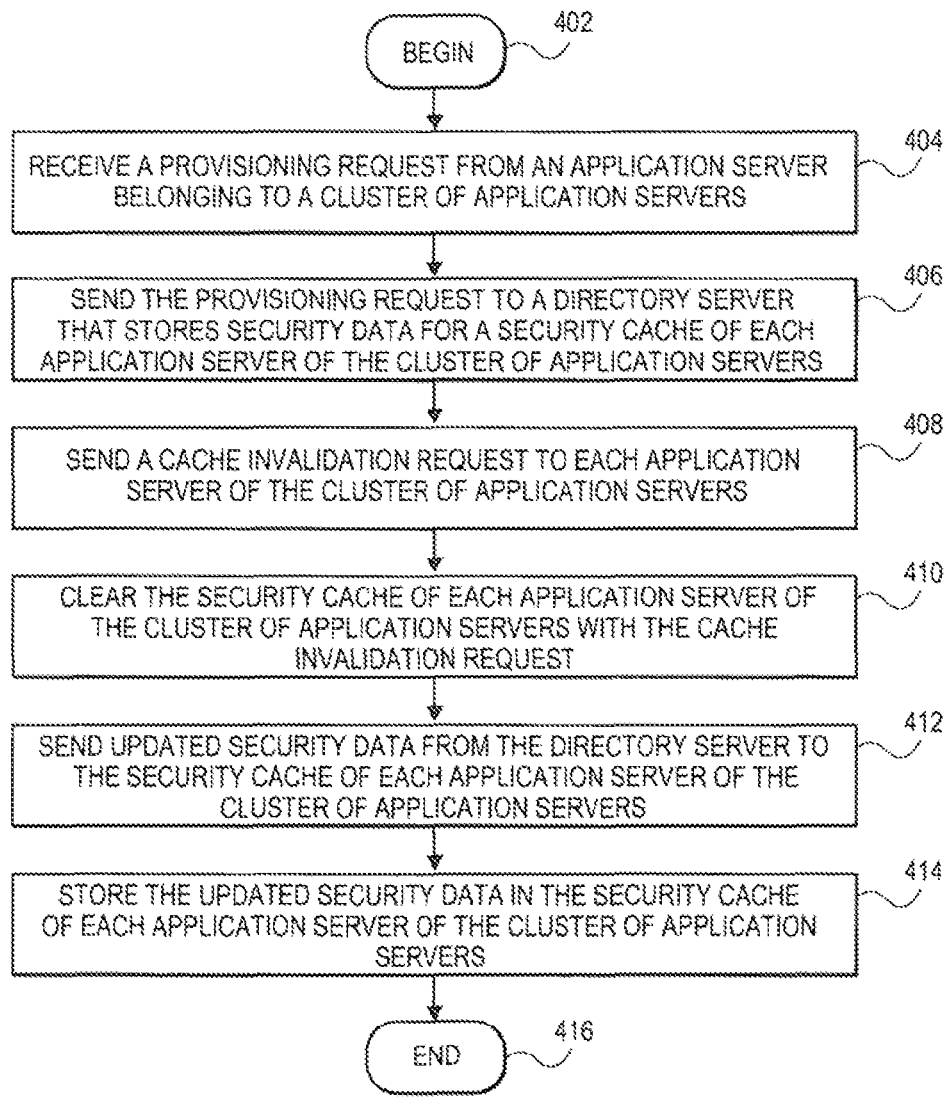
FIG. 4 illustrates a flowchart for configuring a provisioning of security data, according to various embodiments.

FIG. 4 illustrates a flowchart of, overall processing that can be used to maintain security cache data across a cluster of application servers, according to various aspects of the present teachings. In 402, processing can begin. In 404, a provisioning request can be received from a server belonging to a cluster of servers. In embodiments, the provisioning request can be received at a provisioning server from an application server that is attempting to join the cluster of servers. In 406, the provisioning request can be sent to a directory server that stores security data for a security cache of each application server of the cluster of application servers. In embodiments, the provisioning request can be sent from the provisioning server to the directory server. In further embodiments, the provisioning server can be a part of the directory server.

In 408, a cache invalidation request can be sent to each application server of the cluster of application servers. In embodiments, the cache invalidation request can be sent from the provisioning server. In 410, the security cache of each application server of the cluster of application servers can be cleared upon receiving the cache invalidation request. In embodiments, the cache invalidation request can serve to overwrite, erase, or otherwise clear data already in the security caches of the application servers. Further, the security data that is overwritten can be stored in a temporary buffer to ensure that backup data exists in case of, for example, a data write failure.

In 412, the directory server can send updated security data to the security cache of each application server of the cluster of application servers. In embodiments, the updated security data can be modified in the directory server by an administrator or another entity. In 414, the security cache of each application server of the cluster of application servers can store the updated security data received from the directory server. In embodiments, the updated security data can overwrite the all data of the corresponding security cache, or can be stored in addition to any data in the corresponding security cache. In 416, processing can repeat, return to a prior processing point, jump to a further processing point, or end.

The foregoing description is illustrative, and variations in configuration and implementation may occur to persons skilled in the art. For example, while embodiments have been described in which the provisioning server 230 resides in a single server or platform, in embodiments the provisioning server 230 and associated logic can be distributed among multiple servers, services, or systems. Similarly, while embodiments have been described in which one set of application servers 205, 210, 215 can be provisioned with updated security data, in embodiments, multiple sets of application servers can be provisioned in conjunction with operations of the provisioning server 230 and/or the directory server 235. Other resources described as singular or integrated can in embodiments be plural or distributed, and resources described, as multiple or distributed can in embodiments be combined. The scope of the invention is accordingly intended to be limited only by the following claims.

What is claimed is:

1. A method comprising:
   receiving, at a provisioning device by a hardware processor, a security data change provisioning request from a first application server in response to the first application server attempting to join a cluster set of other application servers;
   identifying, in response to receiving the security data change provisioning request, updated security data compatible with a cache of a second application server in the cluster of other application servers;
   sending, to the second application server, a command to clear the cache of the second application server; and
   sending, by the provisioning device, the updated security data to the cache of the second application server of the cluster of the other application servers, wherein the updated security data of the second application server is consistent with security data of the first application server.

2. The method of claim 1, wherein the security data is stored in the cache of the second application server of the cluster of the other application servers.

3. The method of claim 1, wherein:
   the cluster set of the other application servers comprises a plurality of applications servers; and
   each of the plurality of applications servers except the first application server is a member of the cluster set.

4. The method of claim 1, wherein the security data change provisioning request is received from a provisioning application running in the cluster set of application servers.

5. The method of claim 1, wherein the updated security data comprises information associated with users of the set of applications.

6. The method of claim 1, further comprising:
   receiving an indication that the updated security data is available; and
   sending the updated security data to a directory server for storage.

7. The method of claim 1, further comprising:
   receiving an indication that the updated security data is available in a directory server; and
   notifying the cluster set of application servers of the updated security data.

8. A system comprising:
   a memory; and
   a hardware processor couple to the memory to:
      receive, at a provisioning device by the hardware processor, a security data change provisioning request from an application server in a set of application servers, wherein at least one application server of the set of application servers comprises a cache and is to execute a set of applications utilizing security data;
      identify, in response to receiving the security data change provisioning request, updated security data compatible with the cache of the at least one application server of the set of application servers;
      send a command to the at least one application server of the set of application servers to clear the cache of each application server of the set of application servers; and
      send, by the provisioning device, the updated security data to the directory server, wherein the provisioning device and the directory server are separate servers.

9. The system of claim 8, wherein the updated security data is stored in the cache of the at least one application server of the set of application servers.

10. The system of claim 8, wherein the directory server sends the updated security data to the cache of the at least one application server of the set of application servers, wherein the updated security data of the least one application server of the set of application servers is consistent with security data of the application server.

11. The system of claim 8, wherein:
    the security data change provisioning request is received from a first application server of the set of application servers;
    the set of application servers comprises a plurality of application servers; and
    each of the plurality of applications servers except the first application server is a member of a cluster set.

12. The system of claim 11, wherein the security data change provisioning request is received in response to the first application server attempting to join the cluster set.

13. The system of claim 8, wherein the security data change provisioning request is received from a provisioning application running in the set of application servers.

14. The system of claim 8, wherein the updated security data comprises information associated with users of the set of applications.

15. The system of claim 8, wherein the hardware processor is further to:
    receive an indication that the updated security data is available; and
    send the updated security data to a directory server for storage.

16. The system of claim 8, wherein the hardware processor is further to:
    receive an indication that the updated security data is available in a directory server; and
    notify the set of application servers of the updated security data.

* * * * *